(12) United States Patent
Karambelas et al.

(10) Patent No.: US 10,730,726 B2
(45) Date of Patent: Aug. 4, 2020

(54) AUTO-ENGAGING WINCH CLUTCHES, AND ASSOCIATED SYSTEMS AND METHODS

(71) Applicant: Westin Automotive Products, Inc., San Dimas, CA (US)

(72) Inventors: Randy Karambelas, Milwaukie, OR (US); Ron Dennis, Woodburn, OR (US); Timothy Frazier, Beaverton, OR (US)

(73) Assignee: Westin Automotive Products, Inc., San Dimas, CA (US)

( * ) Notice: Subject to any disclaimer, the term of this patent is extended or adjusted under 35 U.S.C. 154(b) by 429 days.

(21) Appl. No.: 15/722,234

(22) Filed: Oct. 2, 2017

(65) Prior Publication Data

US 2018/0118533 A1 May 3, 2018

Related U.S. Application Data

(60) Provisional application No. 62/403,633, filed on Oct. 3, 2016.

(51) Int. Cl.
*B66D 1/16* (2006.01)
*B66D 1/48* (2006.01)
(Continued)

(52) U.S. Cl.
CPC .............. *B66D 1/16* (2013.01); *B66D 1/12* (2013.01); *B66D 1/22* (2013.01); *B66D 1/48* (2013.01);
(Continued)

(58) Field of Classification Search
CPC ... B66D 1/12; B66D 1/14; B66D 1/16; B66D 1/22; B66D 1/48; F16H 3/54; F16H 2200/2033; F16H 2200/2005; F16D 43/02
See application file for complete search history.

(56) References Cited

U.S. PATENT DOCUMENTS 4,004,780 A    1/1977   Kuzarov
4,475,163 A   10/1984   Chandler et al.
(Continued)

FOREIGN PATENT DOCUMENTS

| CN | 103465877 | 12/2013 |
|---|---|---|
| DE | 102015215664 | 2/2016 |
| GB | 2486265 | 6/2012 |

OTHER PUBLICATIONS

U.S. Appl. No. 29/563,917, filed May 9, 2016, Frazier.
(Continued)

*Primary Examiner* — Sang K Kim
*Assistant Examiner* — Nathaniel L Adams
(74) *Attorney, Agent, or Firm* — The Dobrusin Law Firm, PC

(57) ABSTRACT

Auto-engaging winch clutches, and associated systems and methods are disclosed. A representative winch can include a frame, a cable drum, a drive motor supported by the frame, a gear train, and an auto-engaging clutch mechanism. The gear train can include a ring gear and a gear set engaged with the ring gear, the drive motor, and the drum. The auto-engaging clutch mechanism can include a locking element movable from a disengaged position to an engaged position, wherein in the engaged position the ring gear is grounded to the frame, and the gear set is coupled to transfer torque between the drive motor and the cable drum. An engagement mechanism can be coupled between the locking element and the drive motor to automatically move the locking element from the disengaged position to the engaged position and to automatically decouple the locking element from the drive motor when the motor is rotated.

4 Claims, 9 Drawing Sheets

(51) Int. Cl.
*F16D 43/02* (2006.01)
*B66D 1/22* (2006.01)
*B66D 1/12* (2006.01)
*F16H 3/54* (2006.01)

(52) U.S. Cl.
CPC .............. *F16D 43/02* (2013.01); *F16H 3/54* (2013.01); *F16H 2200/2005* (2013.01); *F16H 2200/2033* (2013.01)

(56) References Cited

U.S. PATENT DOCUMENTS

| | | | |
|---|---|---|---|
| 5,995,347 | A | 11/1999 | Rudd et al. |
| D471,338 | S | 3/2003 | Hodge |
| D489,157 | S | 4/2004 | Lawson |
| 6,864,650 | B2 | 3/2005 | Heravi et al. |
| 6,882,917 | B2 | 4/2005 | Pillar |
| 6,885,920 | B2 | 4/2005 | Yakes et al. |
| D513,650 | S | 1/2006 | Elliott |
| 7,063,306 | B2 | 6/2006 | Sanders et al. |
| D532,577 | S | 11/2006 | Elliott et al. |
| 7,184,866 | B2 | 2/2007 | Squires et al. |
| 7,201,366 | B2 | 4/2007 | Sanders et al. |
| D550,923 | S | 9/2007 | Huang |
| D555,874 | S | 11/2007 | Elliott et al. |
| 7,392,122 | B2 | 6/2008 | Pillar |
| 7,511,443 | B2 | 3/2009 | Townsend et al. |
| 7,770,847 | B1 | 8/2010 | Severson |
| 7,891,641 | B1 | 2/2011 | Miller |
| 8,055,403 | B2 | 11/2011 | Lowrey et al. |
| 8,076,885 | B2 | 12/2011 | Heravi et al. |
| 8,248,230 | B2 | 8/2012 | Covaro |
| D670,660 | S | 11/2012 | Cook |
| 8,306,690 | B2 | 11/2012 | Bertness et al. |
| D685,750 | S | 7/2013 | Nakagawa |
| 8,554,440 | B1 | 10/2013 | Davis |
| D703,414 | S | 4/2014 | Fretz et al. |
| 8,944,217 | B2 | 2/2015 | Anasis |
| 8,973,902 | B2 * | 3/2015 | Huang .................... F16D 11/16 254/355 |
| 9,014,913 | B2 | 4/2015 | Heravi et al. |
| D741,038 | S | 10/2015 | Huang |
| 9,315,364 | B2 | 4/2016 | Averill et al. |
| D766,843 | S | 9/2016 | Fretz et al. |
| 9,537,335 | B2 | 1/2017 | Furui et al. |
| D784,934 | S | 4/2017 | Fretz et al. |
| D799,144 | S | 10/2017 | Cui |
| 9,779,557 | B2 | 10/2017 | Hauser et al. |
| 9,810,704 | B2 | 11/2017 | Holmes |
| 2002/0156574 | A1 | 10/2002 | Fortin |
| 2008/0000735 | A1 * | 1/2008 | Huang .................... B60T 13/02 188/171 |
| 2008/0001132 | A1 | 1/2008 | Huang et al. |
| 2008/0166430 | A1 | 7/2008 | Doyle et al. |
| 2009/0284877 | A1 | 11/2009 | Heravi et al. |
| 2010/0155190 | A1 * | 6/2010 | Xie .......................... B66D 1/14 192/71 |
| 2010/0319910 | A1 | 12/2010 | Ives et al. |
| 2011/0065546 | A1 | 3/2011 | Xie et al. |
| 2013/0154821 | A1 | 6/2013 | Miller et al. |
| 2013/0304278 | A1 | 11/2013 | Chen |
| 2014/0001427 | A1 | 1/2014 | Fretz et al. |
| 2014/0257631 | A1 | 9/2014 | Heravi et al. |
| 2015/0191334 | A1 | 7/2015 | Heravi et al. |
| 2015/0298597 | A1 | 10/2015 | Salter et al. |
| 2016/0046468 | A1 | 2/2016 | Heravi et al. |
| 2016/0311667 | A1 | 10/2016 | Huang |
| 2016/0311668 | A1 | 10/2016 | Huang |
| 2017/0062148 | A1 | 3/2017 | Legel |
| 2017/0320709 | A1 | 11/2017 | Frazier et al. |

OTHER PUBLICATIONS

U.S. Appl. No. 29/563,921, filed May 9, 2016, Frazier.
U.S. Appl. No. 29/579,766, filed Oct. 3, 2016, August.
U.S. Appl. No. 29/625,975, filed Nov. 14, 2017, August.
U.S. Appl. No. 29/626,014, filed Nov. 14, 2017, August.
U.S. Appl. No. 14/735,674, filed Jun. 10, 2015, Mason.
U.S. Appl. No. 15/640,091, filed Jun. 30, 2017, Dennis.
U.S. Appl. No. 15/640,091, filed Jun. 30, 2017, Frazier.
U.S. Appl. No. 15/722,234, filed Oct. 2, 2017, Karambelas.
U.S. Appl. No. 15/722,396, filed Oct. 2, 2017, August.
U.S. Appl. No. 15/742,652, filed Oct. 4, 2017, August.
U.S. Appl. No. 15/724,756, filed Oct. 4, 2017, August.
U.S. Appl. No. 15/724,853, filed Oct. 4, 2017, August.
U.S. Appl. No. 15/793,451, filed Oct. 25, 2017, August.
U.S. Appl. No. 15/793,544, filed Oct. 25, 2017, August.
"Automotive Winch Intruction Manual," Comeup Industries ; Inc., http://www.comeup.com/Archive/_eng/all_pdf_eng/Comeup_Automotive_Winch_Instruction_Manual-eng.pdf, Aug. 1, 2013, 22 pages.
Superwinch, "Superwinch SI Industrial Winches," YouTube, https://www.youtube.com/watch?v=bMiDddvCZgs>, accessed Nov. 21, 2016, 1 page.
"The Comeup Cone Brake Structure," COMEUP USA, http://comeupusa.com/2017/04/the-comeup-cone-brake-structure/, Apr. 28, 2017, 2 pages.

\* cited by examiner

AUTO-ENGAGING WINCH CLUTCHES, AND ASSOCIATED SYSTEMS AND METHODS

CROSS-REFERENCE TO RELATED APPLICATION

This application claims the benefit of and priority to U.S. Patent Application No. 62/403,633, filed Oct. 3, 2016, the disclosure of which is incorporated herein by reference in its entirety.

TECHNICAL FIELD

This present technology is directed to winches and, more specifically, to winches including clutch mechanisms, and associated systems and methods.

BACKGROUND

Consumer and industrial winches are typically offered with a clutch mechanism that can be disengaged to allow the winch's drum to be put into a free spool mode, whereby the rope or cable can be pulled off the drum with relative ease. The winch clutch mechanism is then engaged to lock the drum to the gear train and motor during a winching operation. Typically, the clutch mechanism can be manually, pneumatically, or electrically actuated.

BRIEF DESCRIPTION OF THE DRAWINGS

Winches with auto-engaging clutch mechanisms described here may be better understood by referring to the following Detailed Description in conjunction with the accompanying drawings, in which like reference numerals indicate identical or functionally similar elements.

Figure 1:
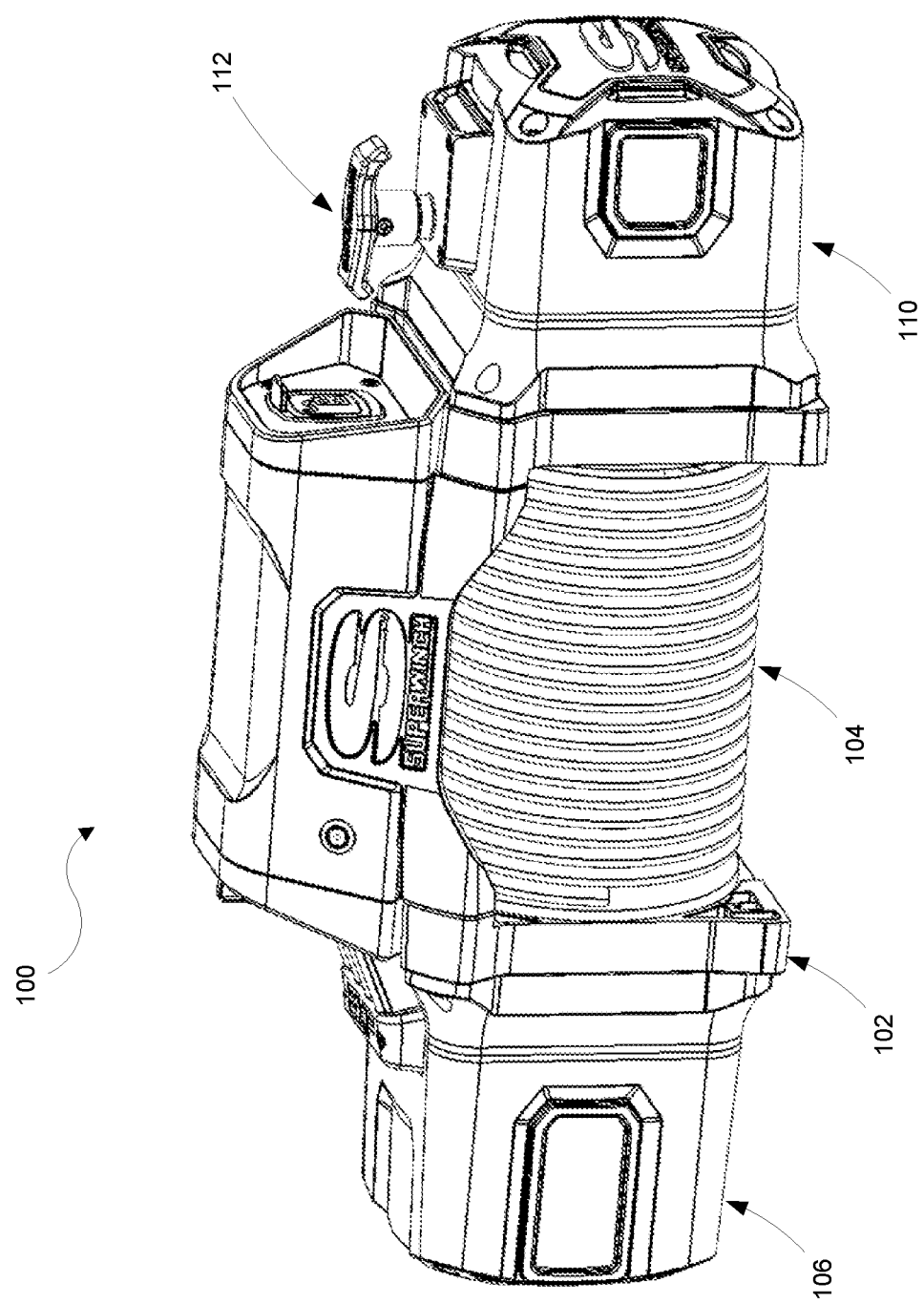
FIG. 1 is an isometric view of a winch with an auto-engaging clutch mechanism configured in accordance with some embodiments of the present technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and/or alternatives falling within the scope of this disclosure.

DETAILED DESCRIPTION

Overview

Consumer and industrial winches are typically offered with a clutch mechanism that can be disengaged to allow the winch's drum to be put into a free spool mode, whereby the rope or cable can be pulled off the drum with relative ease. The winch clutch mechanism is then engaged to lock the drum to the gear train and motor during a winching operation. Conventional winches use a rotation lever, a knob, or a flip-up lever to engage or disengage the drum from the winch's gear train.

The disclosed winches provide a gear-driven clutch mechanism that automatically releases the winch from the free spool condition (drum unlocked) to an engaged condition (drum locked). As explained below, this auto-engaging function occurs after the winch motor is activated in either direction.

General Description

Various examples of the devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

FIG. 1 illustrates a winch 100 with an auto-engaging clutch mechanism according to some embodiments. The winch 100 includes a frame assembly 102 that supports a drive motor 106 which powers a cable drum 104. The drive motor 106 drives the drum 104 through a gear train assembly 110. A clutch mechanism 112 engages and disengages the drum 104 from the gear train assembly 110 to facilitate quickly and easily unwinding the cable from the drum 104.

Figure 2:
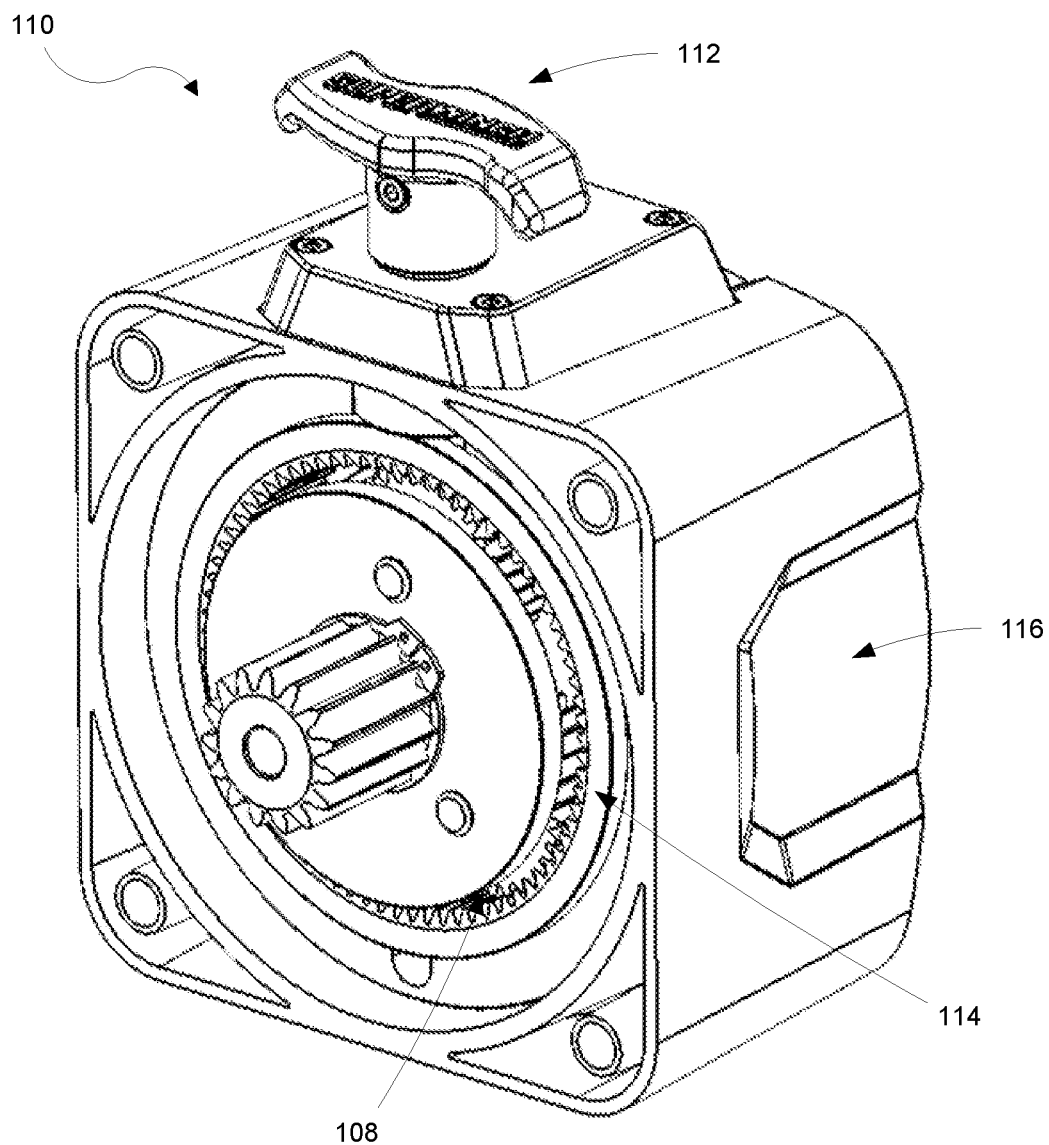
FIG. 2 is an isometric view of the clutch mechanism and gear train assembly of FIG. 1.

As shown in FIG. 2, the gear train assembly 110 includes a planetary gear set 108. The planetary gear set 108 engages a ring gear 114. Accordingly, as long as the ring gear 114 is grounded (e.g., locked) to the gear train housing 116, torque is transferred from the drive motor 106 (FIG. 1) through the gear train 110 to rotate the drum 104 (FIG. 1). However, when the clutch mechanism 112 is disengaged, the ring gear 114 rotates freely within the gear train housing 116. Therefore, when the clutch mechanism 112 is disengaged, the drum 104 can rotate independently of the drive motor 106. Although only one planetary gear set (e.g., stage) is included in some embodiments, some other embodiments can include additional gear sets to provide the desired gear reduction. It should be appreciated that when the ring gear 114 is grounded to the gear train housing 116 it is also grounded to the frame assembly 102.

Figure 3:
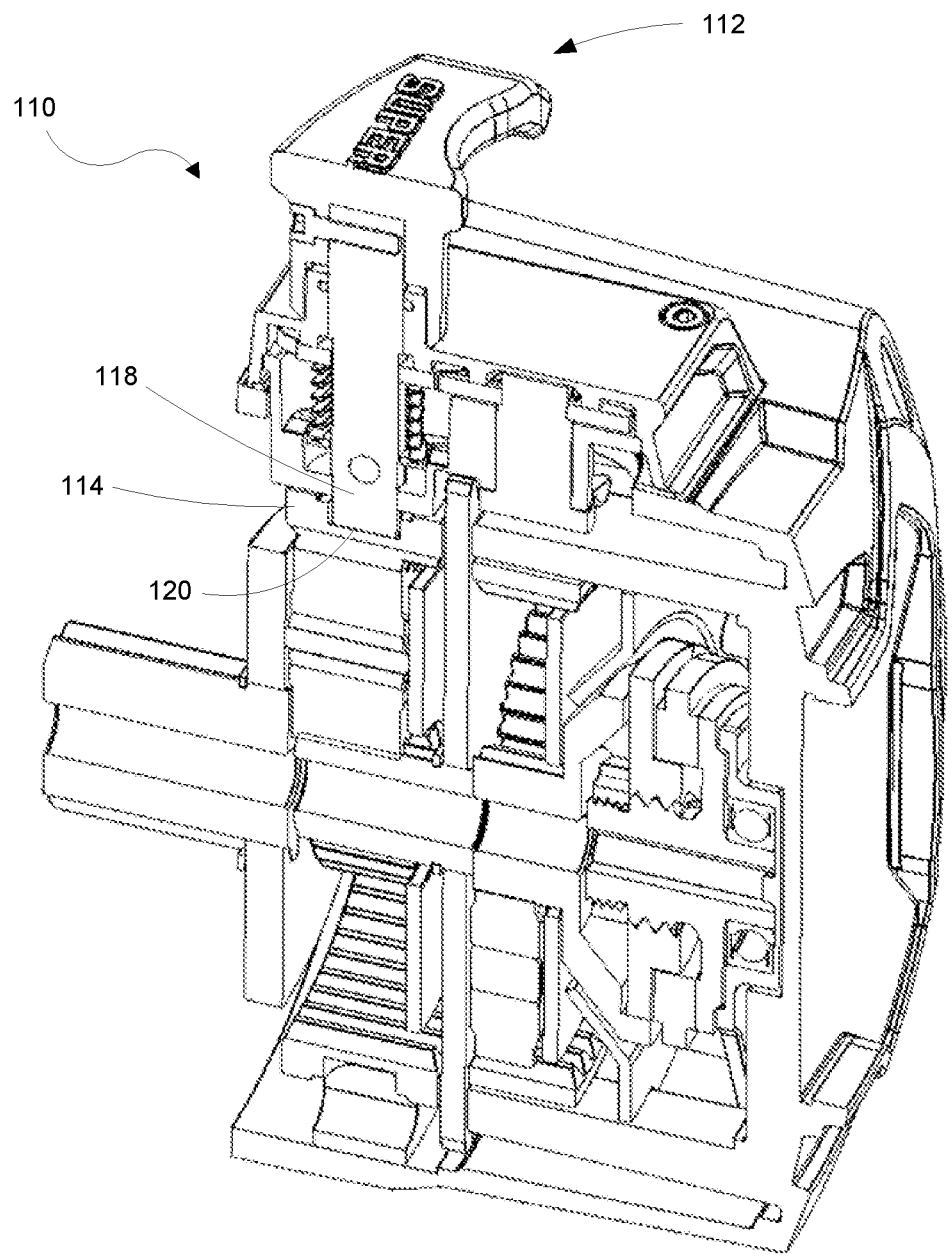
FIG. 3 is a cross-sectional view of the clutch mechanism and gear train assembly shown in FIG. 2.

Referring to FIG. 3, the clutch mechanism 112 can include a locking element, such as locking pin 118 to engage the ring gear 114 when the clutch mechanism 112 is engaged with the gear train. The ring gear 114 includes radial pockets 120 (e.g., radially-indented pockets) formed in the outer circumference of the ring gear 114. The locking pin 118 can mate with one of the radial pockets 120 when the clutch mechanism 112 is in the engaged state as shown in FIG. 3. When the clutch mechanism 112 is disengaged, the locking pin 118 is pulled out of the radial pocket 120, thereby allowing the ring gear 114 to rotate freely.

Figure 4:
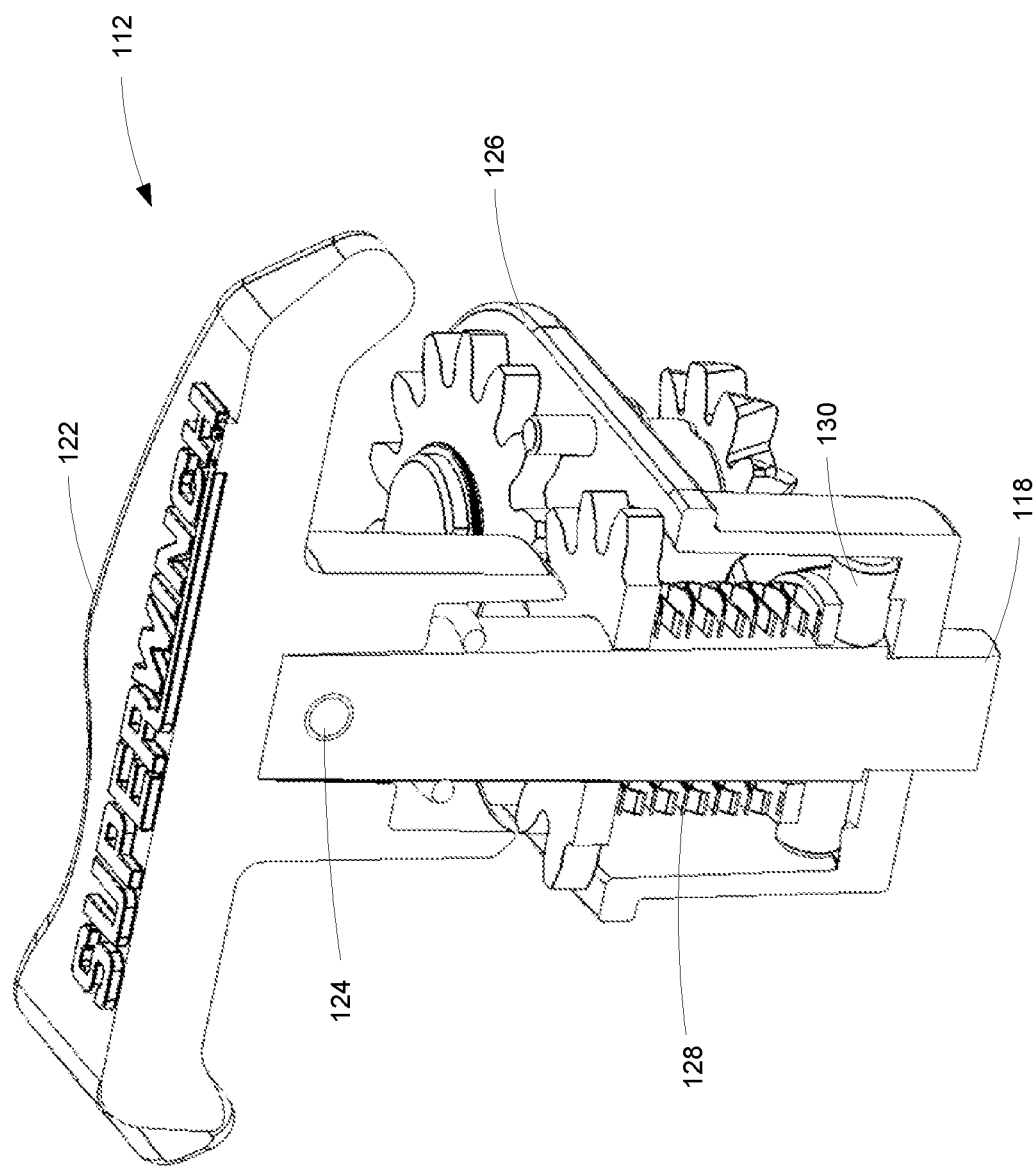
FIG. 4 is a cross-sectional view of the auto-engaging clutch mechanism shown in FIGS. 1-3.
Figure 5:
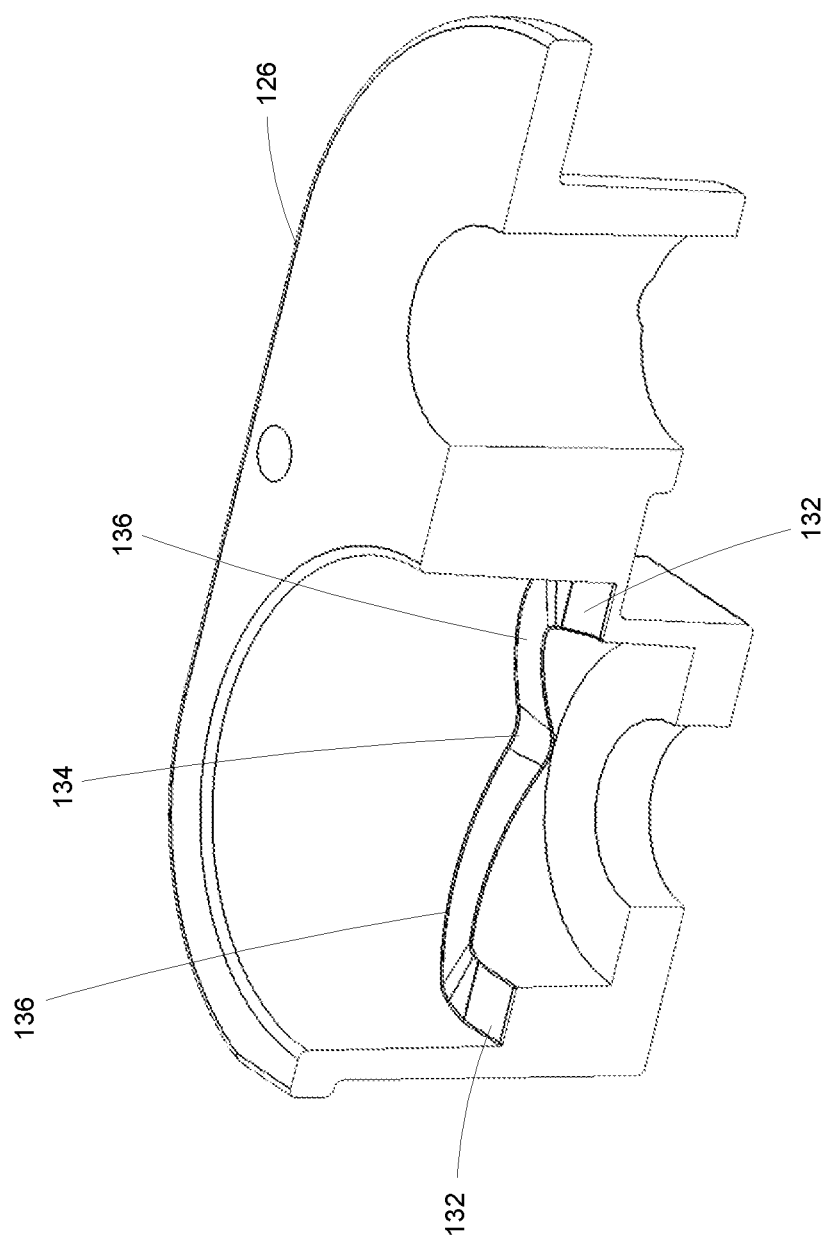
FIG. 5 is a cross-sectional view of a clutch mechanism housing illustrating detent locations in accordance with some embodiments of the present technology.

As shown in FIG. 4, the clutch mechanism 112 can include the locking pin 118 which is attached to a handle 122, e.g., with a set screw 124. The locking pin 118 extends through a clutch housing 126 that contains a spring 128 positioned to urge the locking pin 118 toward the engaged position, e.g., downwardly in the view shown in FIG. 4. In some embodiments, the spring 128 is in the form of several stacked wave or Belleville washers. In some embodiments, the spring 128 can be a compression spring or a wave spring as shown. The clutch mechanism 112 can be manually actuated by pulling the handle 122 against the force applied by the spring 128, thereby moving the locking pin 118 to a disengaged position. The clutch mechanism 112 can be maintained in the disengaged position by rotating the handle 122 approximately 90 degrees and engaging a detent pin 130 (carried by the locking pin 118) with one or more corresponding detent positions, such as notches 132, shown in FIG. 5. When the handle 122 is in the engaged position, the detent pin 130 rests in troughs 134 which can be located between (e.g., midway between) the detent notches 132. In some embodiments, ramped surfaces 136 connect the troughs 134 and detent notches 132 to facilitate smooth rotation of the handle 122 and locking pin 118 between the engaged and disengaged positions.

Figure 6:
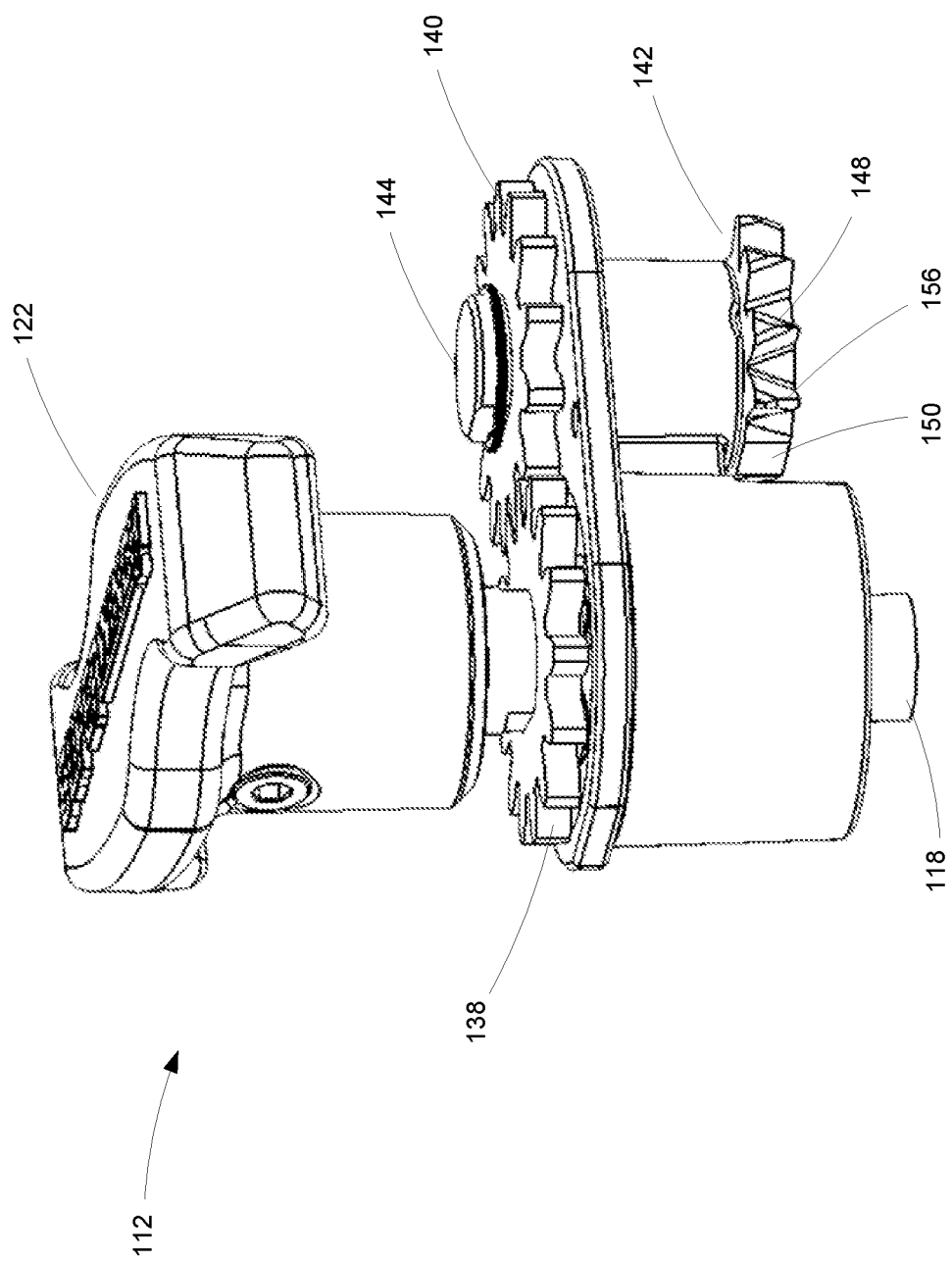
FIG. 6 is an isometric view illustrating an auto-engaging clutch mechanism configured in accordance with some embodiments of the present technology.

In some embodiments, the clutch mechanism 112 can include an engagement mechanism coupled between the locking pin 118 and the drive motor 106 to automatically cause the locking pin 118 to move from the disengaged position to the engaged position when the drive motor 106 is rotated. For example, as shown in FIG. 6, a pin gear 138 is affixed to the locking pin 118 for rotation therewith. The pin gear 138 is meshed with a drive gear 140. In some embodiments, the pin gear 138 and the drive gear 140 are spur gears. The drive gear 140 is affixed to a drive shaft 144 at a first end portion, and a sector gear 142 is affixed to the drive shaft 144 at a second end portion. Accordingly, as the locking pin 118 is rotated, the pin gear 138 causes the sector gear 142 to rotate via the drive gear 140 and the drive shaft 144. The gear ratio between the pin gear 138 and drive gear 140 is one-to-one (1:1) in some embodiments, so that the sector gear 142 rotates 90 degrees when the handle 122 is rotated 90 degrees. The sector gear 142 includes chamfered teeth 148, reentrant teeth 156, and two opposed toothless sectors 150.

Figure 7:
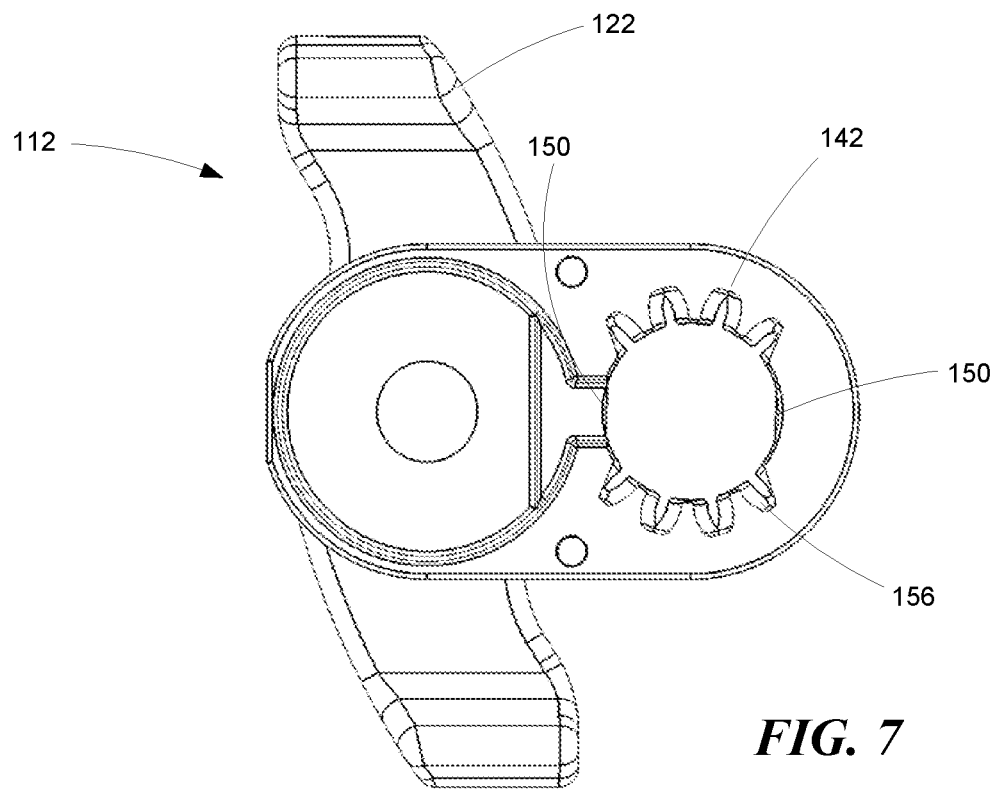
FIG. 7 is a bottom plan view of the auto-engaging clutch mechanism shown in FIG. 6, in an engaged state.
Figure 8:
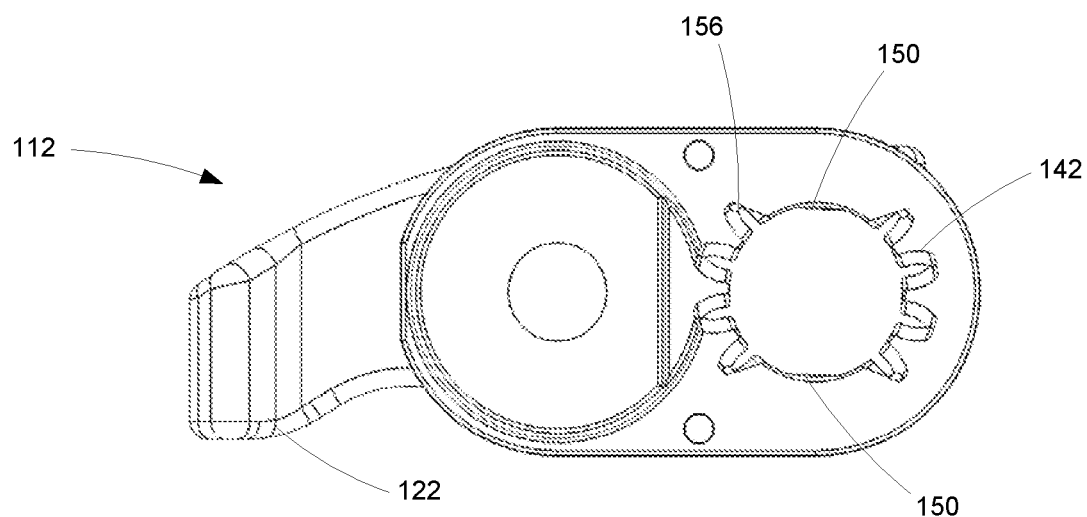
FIG. 8 is a bottom plan view of the auto-engaging clutch mechanism shown in FIG. 6, in a disengaged state.
Figure 9:
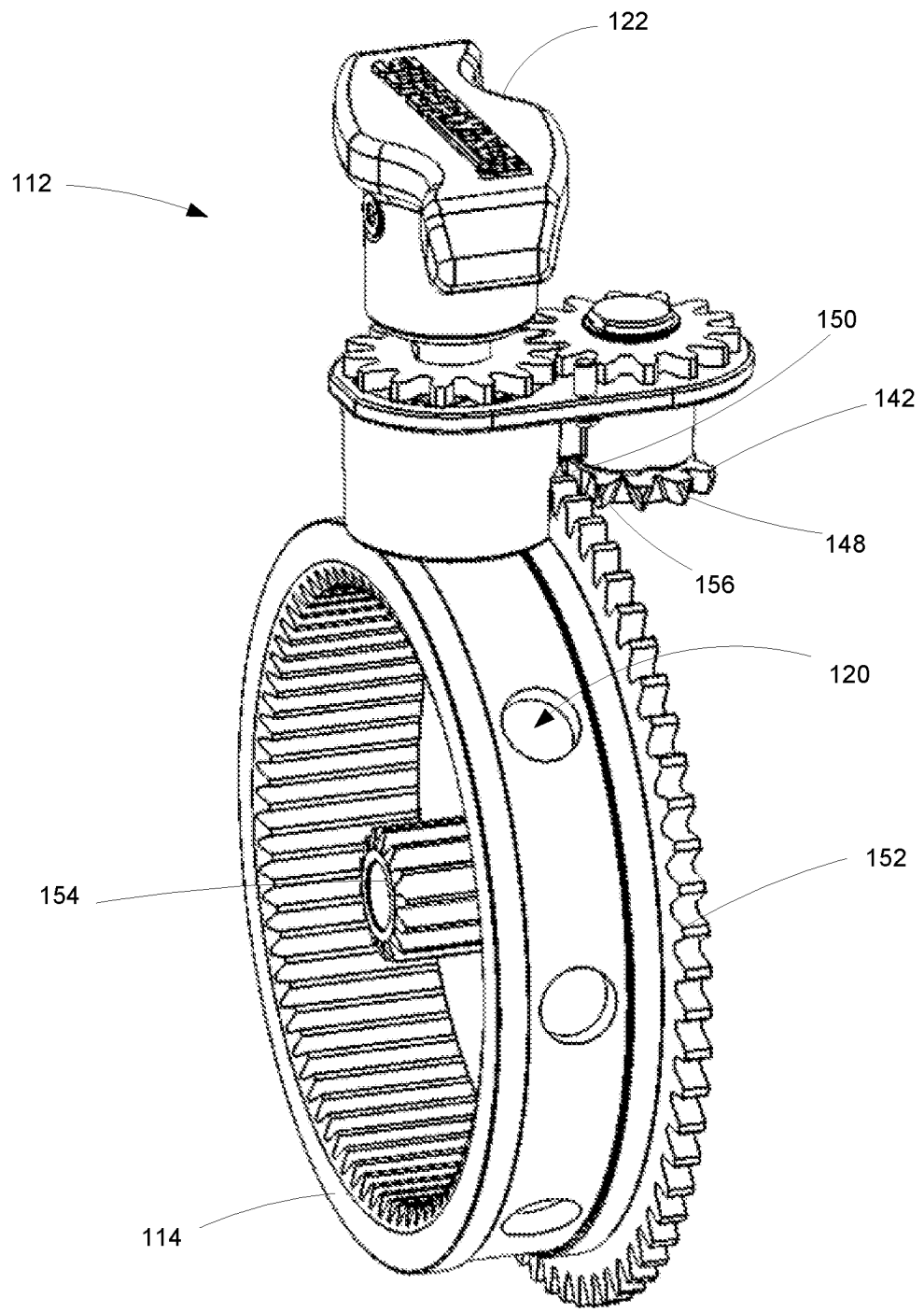
FIG. 9 is an isometric view illustrating an activation gear and clutch mechanism in an engaged configuration in accordance with some embodiments of the present technology.

FIGS. 7 and 8 illustrate the clutch mechanism 112 from below. With reference to FIGS. 7 and 8, the sector gear 142 rotates with the handle 122 between the engaged position (FIG. 7) and the disengaged position (FIG. 8). With further reference to FIG. 9, the clutch mechanism 112 includes an activation gear 152 that rotates when the drive motor 106 (FIG. 1) rotates in either direction. In some embodiments, the activation gear 152 is connected to the planetary carrier set 154. The sector gear 142 is not meshed with the activation gear 152 when the handle 122 is in the engaged position (FIGS. 7 and 9). In particular, as shown in FIG. 9, the toothless sector 150 is positioned adjacent the activation gear 152 such that the teeth 148 do not mesh with the teeth of the activation gear.

Figure 10:
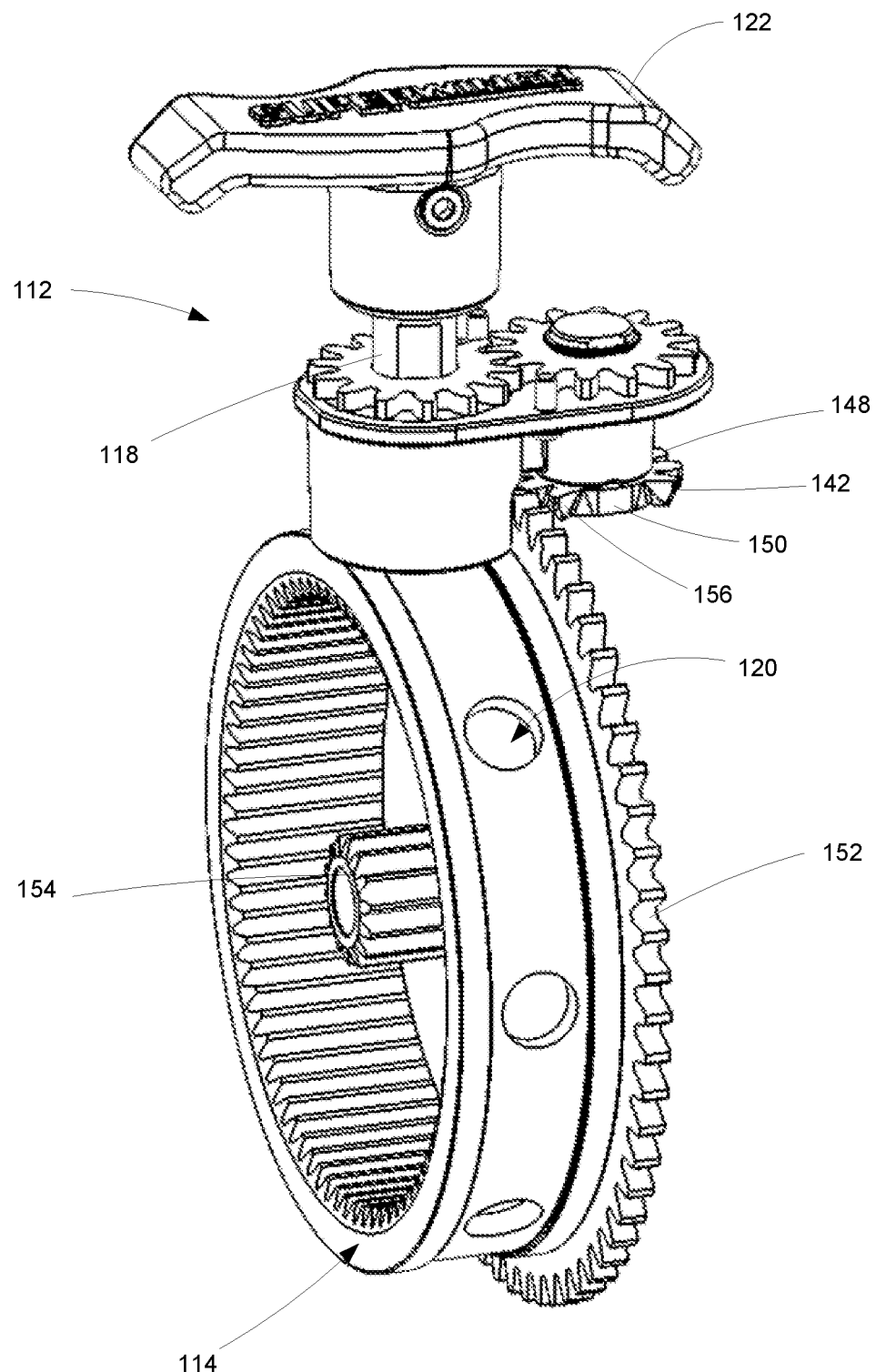
FIG. 10 is an isometric view illustrating an activation gear and clutch mechanism in a disengaged configuration in accordance with some embodiments of the present technology.

However, when the handle 122 is moved to the disengaged position, as shown in FIG. 10, the teeth 148 of the sector gear 142 engage the teeth of the activation gear 152. The reentrant teeth 156 on the sector gear 142 are shaped to ensure smooth engagement as the sector gear 142 is brought into mesh with the activation gear 152 as the operator effects disengagement. Thus, when the drive motor 106 (FIG. 1) is energized in either a forward or reverse direction, the activation gear 152 drives the sector gear 142, which in turn rotates the clutch handle 122 90 degrees to the engaged position. The spring 128 (FIG. 4) urges the clutch pin 118 downwardly, so that once the ring gear 114 rotates into position, the clutch pin 118 drops into one of multiple machined pockets 120 in the ring gear 114. This in turn grounds the ring gear 114, putting the winch into a locked, or engaged mode.

One feature of clutch mechanisms having configurations in accordance with embodiments described above, is that the winch can be automatically engaged when the drive motor is activated. An advantage of this arrangement is that it can save the operator from having to be within physical reach of the winch to re-engage the clutch (after it has been disengaged) and/or take the operator's step of activating the drive motor as an indication that the winch is to be activated, even if the operator may have inadvertently forgotten to re-engage the clutch.

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

In a some embodiments, a representative auto-engaging winch clutch comprises a locking pin positioned for selectively engaging and disengaging a ring gear of a winch gear train. The locking pin can be rotatably coupled to a drive motor, whereby rotation of the drive motor causes the locking pin to move from a disengaged state to an engaged state.

In some embodiments, a representative winch gear train assembly comprises a gear train housing mountable to a winch, a ring gear positioned in the gear train housing, and a gear set engaged with the ring gear and coupleable to a drive motor and a drum of the winch. The winch gear train assembly can also include an auto-engaging clutch mechanism. The auto-engaging clutch mechanism can include a locking element movable from a disengaged position to an engaged position, wherein in the engaged position the ring gear is grounded to the gear train housing, and the gear set is coupled to transfer torque between the drive motor and the winch drum. An engagement mechanism can be coupled between the locking element and the gear set to automatically cause the locking element to move from the disengaged position to the engaged position when the drive motor is rotated.

In some embodiments, a representative winch comprises a drive motor, a gear train assembly, and an auto-engaging clutch. The auto-engaging clutch comprises a locking pin moveable between a locked position and an unlocked position for selectively engaging and disengaging a ring gear of the gear train assembly. The locking pin can be rotatably coupled to the drive motor via an activation gear when the locking pin is in the unlocked position. Rotation of the drive motor causes the locking pin to move from the unlocked position to the locked position. The locking pin can include a handle to facilitate manually moving the locking pin from the locked position to the unlocked position. The locking pin can include one or more detents to retain the locking pin in the unlocked position until moved by the drive motor and activation gear. The locking pin can include a sector gear configured to engage the activation gear when the locking pin is in the unlocked position and disengage from the activation gear when the locking pin is in the locked position.

In some embodiments, a representative method for automatically engaging a winch clutch comprises placing a locking element in a disengaged position relative to a ring gear of a winch gear train and coupling the locking element to a drive motor of the winch while the locking element is in the disengaged position. Upon rotation of the drive motor, the locking element can be automatically decoupled from the drive motor and the locking element can be automatically moved to an engaged position, in which the locking element effectively grounds the ring gear to a frame of the winch. In some embodiments, the method further comprises moving the locking element from the engaged position to the disengaged position. In some embodiments, automatically decoupling the locking element from the drive motor comprises rotating the locking element. In some embodiments, automatically moving the locking element to an engaged position comprises moving the locking element in a radial direction toward the ring gear.

The following examples provide additional embodiments of the present technology.

EXAMPLES

1. A winch gear train assembly, comprising:
a gear train housing mountable to a winch;
a ring gear positioned in the gear train housing;
a gear set engaged with the ring gear and coupleable to a drive motor and a drum of the winch; and
an auto-engaging clutch mechanism, comprising:
a locking element movable from a disengaged position to an engaged position, wherein in the engaged position the ring gear is grounded to the gear train housing, and the gear set is coupled to transfer torque between the drive motor and the winch drum; and
an engagement mechanism coupled between the locking element and the gear set to automatically cause the locking element to move from the disengaged position to the engaged position when the drive motor is rotated.

2. The winch gear train assembly of example 1, further comprising a handle attached to the locking element to facilitate moving the locking element toward the disengaged position.

3. The winch gear train assembly of example 1 or 2, wherein the ring gear includes at least one radially-indented pocket positioned to mate with the locking element when the locking element is in the engaged position.

4. The winch gear train assembly of any one of examples 1-3, wherein the gear set comprises a planetary gear set.

5. The winch gear train assembly of any one of examples 1-4, further comprising a clutch housing and a detent pin extending laterally from the locking element to engage one or more detent positions formed in the clutch housing when the locking element is in the disengaged position.

6. The winch gear train assembly of any one of examples 1-5, further comprising a spring positioned around the locking element to urge the locking element toward the engaged position.

7. The winch gear train assembly of any one of examples 1-6, wherein the engagement mechanism is positioned to cause the locking element to rotate and disengage the detent pin from the one or more detent positions.

8. The winch gear train assembly of any one of examples 1-7, wherein the engagement mechanism comprises:
an activation gear coupled to the gear set; and
a sector gear coupled to the locking element, the sector gear having multiple teeth and at least one toothless sector;
wherein the toothless sector is positioned adjacent the activation gear when the locking element is in the engaged position to prevent the sector gear teeth from meshing with the activation gear.

9. A winch, comprising:
a frame;
a cable drum;
a drive motor supported by the frame;
a gear train, comprising:
a ring gear; and
a gear set engaged to the ring gear, the drive motor, and the cable drum; and
an auto-engaging clutch mechanism, comprising:
a locking element movable from a disengaged position to an engaged position, wherein in the engaged position the ring gear is grounded to the frame, and the gear set is coupled to transfer torque between the drive motor and the cable drum; and
an engagement mechanism coupled between the locking element and the drive motor to automatically cause the locking element to move from the disengaged position to the engaged position when the drive motor is rotated.

10. The winch of example 9, wherein the locking element comprises a locking pin and further comprising a handle attached to the locking pin.

11. The winch of example 9 or 10, wherein the ring gear includes at least one radially-indented pocket positioned to mate with the locking pin when the locking pin is in the engaged position.

12. The winch of any one of examples 9-11, wherein the gear set comprises a planetary gear set.

13. The winch any one of examples 9-12, further comprising a clutch housing and a detent pin extending laterally from the locking element to engage one or more detent positions formed in the clutch housing when the locking element is in the disengaged position.

14. The winch any one of examples 9-13, further comprising a spring positioned against the detent pin to urge the locking element toward the engaged position.

15. The winch any one of examples 9-14, wherein the engagement mechanism is positioned to cause the locking element to rotate and disengage the detent pin from the one or more detent positions.

16. The winch any one of examples 9-15, wherein the engagement mechanism comprises:
 an activation gear coupled to the gear set; and
 a sector gear coupled to the locking element, the sector gear having multiple teeth and at least one toothless sector;
 wherein the toothless sector is positioned adjacent the activation gear when the locking element is in the engaged position to prevent the sector gear teeth from meshing with the activation gear.

17. A method for automatically engaging a winch clutch, the method comprising:
 placing a locking element in a disengaged position relative to a ring gear of a winch gear train;
 coupling the locking element to a drive motor of the winch while the locking element is in the disengaged position; and
 upon rotation of the drive motor, automatically decoupling the locking element from the drive motor and automatically moving the locking element to an engaged position, in which the locking element grounds the ring gear to a frame of the winch.

18. The method of example 17, further comprising moving the locking element from the engaged position to the disengaged position.

19. The method of example 17 or 18, wherein automatically decoupling the locking element from the drive motor comprises rotating the locking element.

20. The method of any one of examples 17-19, wherein automatically moving the locking element to an engaged position comprises moving the locking element in a radial direction toward the ring gear.

What is claimed is:

1. A winch, comprising: a frame; a cable drum; a drive motor supported by the frame; a gear train, comprising: a ring gear; and a gear set engaged to the ring gear, the drive motor, and the cable drum; and an auto-engaging clutch mechanism, comprising: a locking element movable from a disengaged position to an engaged position, wherein in the engaged position the ring gear is grounded to the frame, and the gear set is coupled to transfer torque between the drive motor and the cable drum; and an engagement mechanism coupled between the locking element and the drive motor to automatically cause the locking element to move from the disengaged position to the engaged position when the drive motor is rotated, wherein the winch further comprising:
 (i) a clutch housing and a detent pin extending laterally from the locking element to engage one or more detent positions formed in the clutch housing when the locking element is in the disengaged position;
 (ii) a spring positioned against the detent pin to urge the locking element toward the engaged position wherein:
  (a) the engagement mechanism is positioned to cause the locking element to rotate and disengage the detent pin from the one or more detent positions; and
  (b) the engagement mechanism comprises: an activation gear coupled to the gear set; and a sector gear coupled to the locking element, the sector gear having multiple teeth and at least one toothless sector; wherein the toothless sector is positioned adjacent the activation gear when the locking element is in the engaged position to prevent the sector gear teeth from meshing with the activation pear.

2. The winch of claim 1, wherein the locking element comprises a locking pin and further comprising a handle attached to the locking pin.

3. The winch of claim 2, wherein the ring gear includes at least one radially-indented pocket positioned to mate with the locking pin when the locking pin is in the engaged position.

4. The winch of claim 1, wherein the gear set comprises a planetary gear set.

* * * * *